(12) United States Patent
Sakurai et al.

(10) Patent No.: US 7,679,658 B2
(45) Date of Patent: Mar. 16, 2010

(54) SOLID-STATE IMAGE PICKUP APPARATUS (75) Inventors: Katsuhito Sakurai, Machida (JP); Masaru Fujimura, Sagamihara (JP); Masanori Ogura, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 570 days.

(21) Appl. No.: 11/564,567

(22) Filed: Nov. 29, 2006

(65) Prior Publication Data
US 2007/0126886 A1 Jun. 7, 2007

(30) Foreign Application Priority Data
Dec. 2, 2005 (JP) .............................. 2005-349872

(51) Int. Cl.
H04N 9/64 (2006.01)
(52) U.S. Cl. ..................................... 348/243
(58) Field of Classification Search .............. 348/222.1, 348/241, 243
See application file for complete search history.

(56) References Cited

U.S. PATENT DOCUMENTS

| | | | |
|---|---|---|---|
| 6,525,769 B1* | 2/2003 | Thomas et al. | 348/243 |
| 6,960,751 B2 | 11/2005 | Hiyama et al. | 250/208.1 |
| 7,227,208 B2 | 6/2007 | Ogura et al. | 257/292 |
| 2002/0149679 A1* | 10/2002 | Deangelis et al. | 348/207.99 |
| 2003/0164887 A1 | 9/2003 | Koizumi et al. | 348/308 |
| 2004/0196392 A1* | 10/2004 | Yahagi et al. | 348/241 |
| 2005/0268960 A1 | 12/2005 | Hiyama et al. | 136/244 |
| 2005/0269604 A1 | 12/2005 | Koizumi et al. | 257/291 |
| 2006/0043393 A1 | 3/2006 | Okita et al. | 257/93 |
| 2006/0043440 A1 | 3/2006 | Hiyama et al. | 257/291 |
| 2006/0044434 A1 | 3/2006 | Okita et al. | 348/294 |
| 2006/0044439 A1 | 3/2006 | Hiyama et al. | 348/308 |
| 2006/0114342 A1* | 6/2006 | Egawa | 348/241 |
| 2006/0208161 A1 | 9/2006 | Okita et al. | 250/208.1 |
| 2006/0208291 A1 | 9/2006 | Koizumi et al. | 257/292 |
| 2006/0208292 A1 | 9/2006 | Itano et al. | 257/292 |
| 2006/0221667 A1 | 10/2006 | Ogura et al. | 365/149 |

FOREIGN PATENT DOCUMENTS

| | | |
|---|---|---|
| JP | 3-240379 A | 10/1991 |
| JP | 2002-64196 A | 2/2002 |
| JP | 2003-134400 A | 5/2003 |

* cited by examiner

*Primary Examiner*—Tuan Ho
(74) *Attorney, Agent, or Firm*—Fitzpatrick, Cella, Harper & Scinto

(57) ABSTRACT

It is intended to obtain a high quality image which is not affected by the fluctuation of dark outputs, and pixels having a specifically large dark output, called defects, and has no lateral line etc. A solid-state image pickup apparatus including: an aperture pixel region which accumulates and outputs the electric charges generated depending on incident light; a light shielded optical black region; a black reference pixel region in which no impurity region for accumulating electric charges is formed; and level shifting means which shifts the reference level of the output signals of the black reference pixel region with respect to the reference levels of the output signals of the aperture pixel region and the optical black region, is provided.

8 Claims, 7 Drawing Sheets

SOLID-STATE IMAGE PICKUP APPARATUS

BACKGROUND OF THE INVENTION

1. Field of the Invention

The present invention relates to a solid-state image pickup apparatus.

2. Description of the Related Art

Usually, a solid-state imagepickup apparatus includes an optical black region (OB region) which is light shielded so as not to react with light in order to obtain a signal (black reference signal) serving as a reference signal for a signal level. An effective pixel signal is arithmetically processed with reference to the signal outputted from the OB region. Such a pixel is called OB pixel. When such a solid-state image pickup apparatus is used for a digital still camera, etc., a prolonged period exposure time causes dark currents to be accumulated in the pixel to increase so that the dark current values fluctuate for every pixel and the fluctuation of signals become large. Although the black reference signal is obtained by clamping the output from the OB region, due to the fluctuation of signals as mentioned above, the black reference signal for every row fluctuates, resulting in such an adverse effect that lateral stripe occur on an image screen.

Moreover, as a countermeasure when a light shielding film constituting the OB region has a defect which causes light transmission to occur, in Japanese Patent Application Laid-Open No. H03-240379 (Patent document 1), a solid-state image pickup apparatus is disclosed, in which an impurity region for accumulating electric charges is not formed in the OB region. Since there is no accumulation of electric charges due to the dark currents, in the OB region of the solid-state image pickup apparatus, the above-mentioned adverse effect is suppressed. However, since, if especially, the exposure time period becomes long, a difference between the original black reference signal of the effective pixel region and the signal of the OB region will occur, it is difficult to supply an exact black reference signal.

The countermeasure for such a problem is disclosed in Japanese Patent Application Laid-Open No. 2002-64196 (Patent document 2). In the patent document 2, a solid-state image pickup apparatus includes a first OB region which is formed by implanting impurities into a semiconductor substrate, and a second OB region of which semiconductor substrate is not implanted with impurities, as the OB region. A signal from an effective pixel region is clamped with reference to the analog signal outputted from the second OB region, converted into a digital signal, and after that the digital signal is further clamped with reference to the digital signal outputted from the first OB region. It is supposed that while stable clamping including no unnecessary dark current, can be performed in this manner, the influence of the dark currents on the signals of the effective pixel region can be corrected exactly.

However, according to the configuration of the Patent document 2, the difference in output between the first OB region and the second OB region is present by an amount of the output voltage due to the dark currents. Consequently, the dynamic range of a circuit performing analog clamping and an analog-to-digital converter, and the dynamic range of the digital output of the analog-to-digital converter are required to be larger by the amount of the difference due to the dark currents.

Moreover, according to the layout view of the effective pixel region and the OB region, the first OB region formed by implanting impurities into a semiconductor substrate is arranged only at a part of each row (a horizontal optical black region in the second half of each row). Thus, in order to obtain a stable output level in the head row of the effective pixel region, the layout is configured to perform clamping using only the second OB region, of which semiconductor substrate is not injected with impurities.

In view of the above-mentioned problems, the object of the present invention is to obtain a high quality image with no lateral line etc. without being affected by the fluctuation of the dark outputs, and signals having a specifically large or small dark output, called defects.

SUMMARY OF THE INVENTION

The solid-state image pickup apparatus of the present invention includes: an aperture pixel region for accumulating electric charges generated depending on incident light, and outputting it; a light shielded optical black region, a black reference pixel region in which no impurity region for accumulating electric charges is formed, and a level shifting means for shifting the reference level of the output signal of the black reference pixel region with respect to the reference levels of the output signal of the aperture pixel region and the optical black region.

Moreover, the processing method of the solid-state image pickup apparatus of the present invention, is a processing method of a solid-state image pickup apparatus including: an aperture pixel region for accumulating electric charges generated depending on incident light, and outputting it; a light shielded optical black region, and a black reference pixel region in which no impurity region for accumulating electric charges is formed; and includes a step for shifting the reference level of the output signal of the black reference pixel region with respect to the reference levels of the output signal of the aperture pixel region and the optical black region.

Moreover, the solid-state image pickup system of the present invention includes: a solid-state image pickup apparatus including an aperture pixel region for accumulating electric charges generated depending on incident light and outputting it, a light shielded optical black region, and a black reference pixel region in which no impurity region for accumulating electric charges is formed; clamping means for clamping the output signal of the solid-state image pickup apparatus depending on the output signal of the optical black region; and subtracting means for subtracting the average value of the output signal of the black reference pixel region from the output signal of the solid-state image pickup apparatus.

Moreover, the processing method, using a solid-state image pickup apparatus, of the present invention is a processing method using a solid-state image pickup apparatus including an aperture pixel region for accumulating electric charges generated depending on incident light and outputting it, a light shielded optical black region, and a black reference pixel region in which no impurity region for accumulating electric charges is formed, includes: clamping step for clamping the output signal of the solid-state image pickup apparatus depending on the output signal of the optical black region; and subtracting step for subtracting the average value of the output signal of the black reference pixel region from the output signal of the solid-state image pickup apparatus.

Further features of the present invention will become apparent from the following description of exemplary embodiments with reference to the attached drawings.

DESCRIPTION OF THE EMBODIMENTS

First Embodiment

Figure 1:
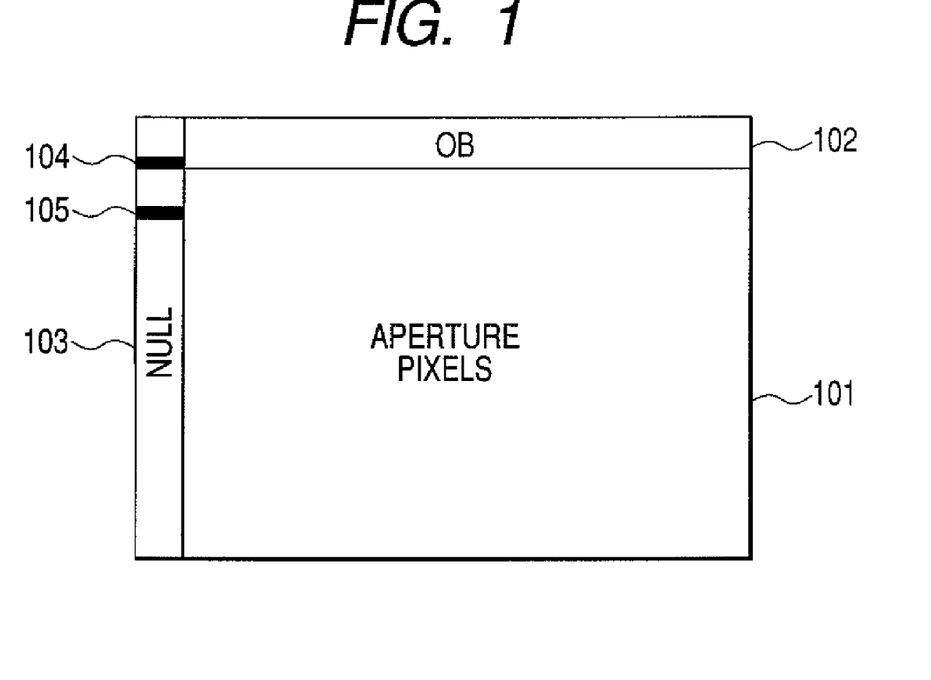
FIG. 1 is a plan view of a solid-state image pickup apparatus showing a first embodiment of the present invention.

FIG. 1 is a plan view showing an example of the configuration of a solid-state image pickup apparatus according to a first embodiment of the present invention. As shown in FIG. 1, the solid-state image pickup apparatus of this embodiment includes a photoelectric conversion signal outputting region 101, a first black reference signal outputting region 102, and a second black reference signal outputting region 103.

In the photoelectric conversion signal outputting region 101, a large number of photoelectric conversion signal outputting elements are arranged. The photoelectric conversion signal outputting elements can also be called pixels, and composed of a photoelectric conversion device such as a photo-diode, and a reading circuit for reading the signal of the photoelectric conversion device.

The first black reference signal outputting region 102 is a light shielded region provided neighboring the photoelectric conversion signal outputting region 101 in the vertical direction. In the first black reference signal outputting region, a plurality of first black reference signal outputting elements are arranged.

The second black reference signal outputting region 103 is provided neighboring the photoelectric conversion signal outputting region 101 in the horizontal direction. In the second black reference signal outputting region, a plurality of second black reference signal outputting elements are arranged. The second black reference signal outputting elements do not have a semiconductor region for accumulating electric charges (dark currents), but the other reading circuit etc. can be configured in a similar configuration to that of the photoelectric conversion signal outputting element. Here, the semiconductor region for accumulating electric charges, is, for example, when the photoelectric conversion device is a photo-diode, a semiconductor region having the same type as that of the electric charges dealt as a signal. When electrons are read as a signal, the semiconductor region is an n-type semiconductor region constituting the photo-diode.

Figure 2:
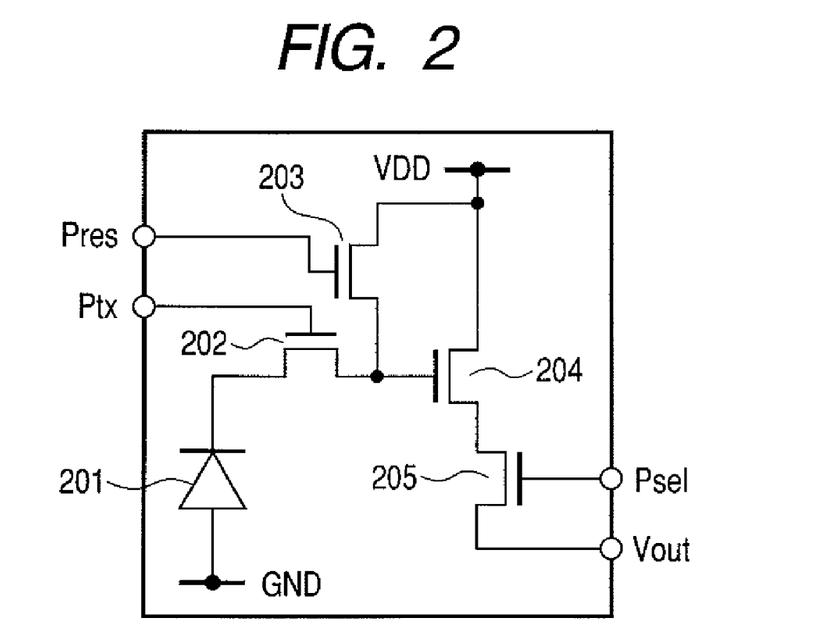
FIG. 2 is a block diagram of a pixel cell of a MOS type solid-state image pickup apparatus.

FIG. 2 is a block diagram of a signal output element of a MOS-type solid-state image pickup apparatus. The photo-electric conversion signal outputting element and the first black reference signal outputting element can be expressed using a similar block diagram. The second black reference signal outputting element has a configuration with no diode denoted as 201 in FIG. 2. Hereinafter, when it is not required to separate the photoelectric conversion signal outputting element, and the first and the second black reference signal outputting elements, they are described as a signal outputting element.

In FIG. 2, reference numeral 201 is a photo-diode having a function of a photoelectric conversion device for generating light signal electric charges, and in this example, the anode side thereof is grounded. The cathode side of the photo-diode 201 is connected to the gate of an amplification MOS transistor 204 via a transmission MOS transistor 202. A configuration in which the light signal electric charges are transmitted to a floating diffusion once, and the floating diffusion is electrically connected to the gate of the MOS transistor 204, may also used. Moreover, the gate of amplification MOS transistor 204 is connected to the source of a reset MOS transistor 203, in order to be supplied with a predetermined voltage. A power supply voltage VDD is supplied to the drain of the reset MOS transistor 203. Furthermore, as for the amplification MOS transistor 204, the power supply voltage VDD is supplied to the drain thereof, and the source thereof is connected to the drain of a selection MOS transistor 205.

Figure 3:
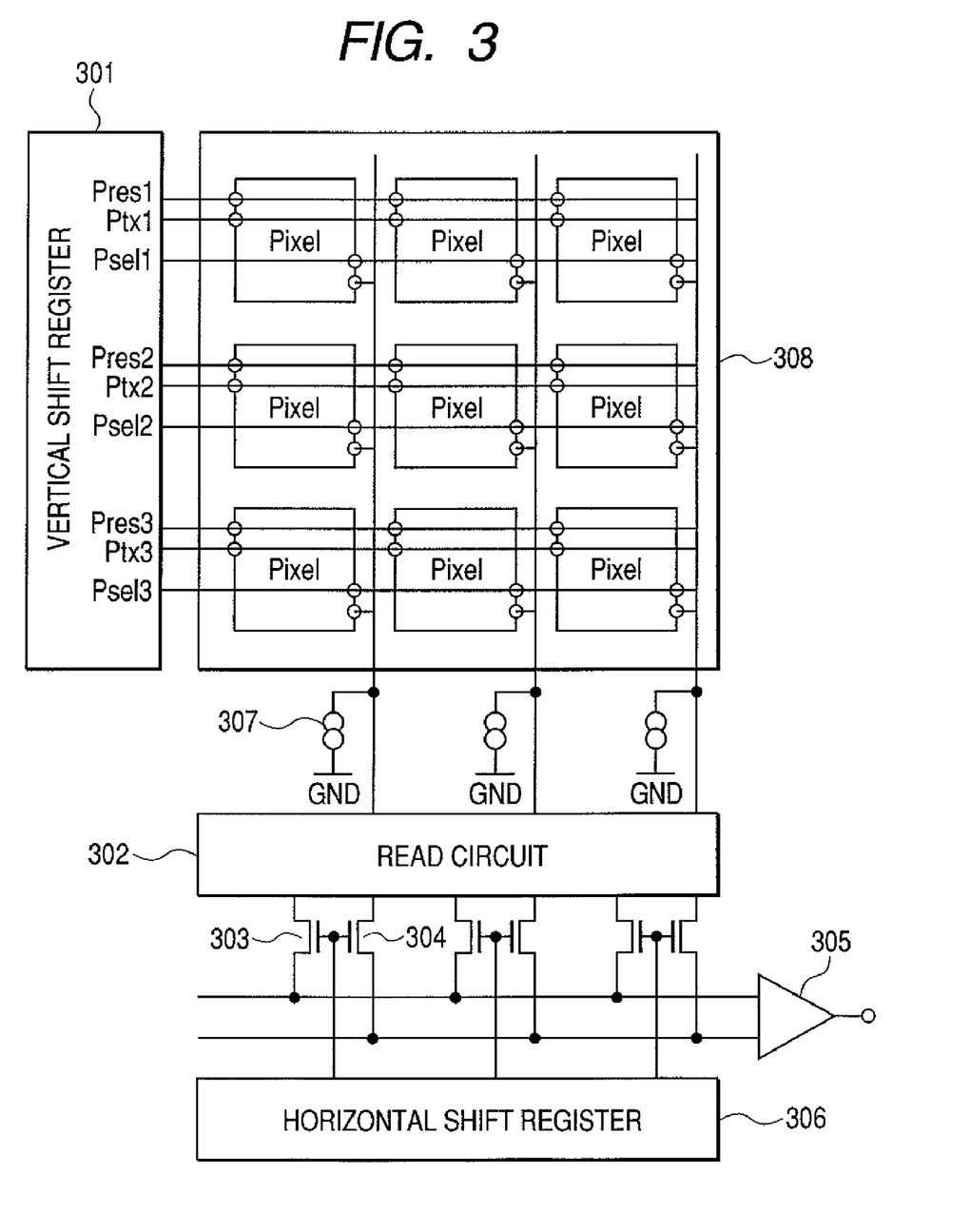
FIG. 3 is a block diagram of the MOS type solid-state image pickup apparatus.

FIG. 3 is a block diagram showing an example of the configuration of the MOS type solid-state image pickup apparatus. A vertical shift register 301 supplies a signal pulse to row selection lines such as Pres1, Ptx1 and Psel1. A region 308 has a configuration of FIG. 1, and a plurality of signal outputting elements Pixel. Signals are outputted from each of the signal outputting elements Pixel to a vertical signal line.

A reading circuit 302, to which the signals outputted from the signal outputting element to the vertical signal line are supplied, holds the supplied signals, and outputs the held signals to a differential amplifier 305. As an example, a light signal in which noise signals are superposed and the noise signals are held. Moreover, a configuration further including an amplifier may be used.

A horizontal shift register 306 controls the on-and-off of transistors 303 and 304. The differential amplifier 305 outputs the difference between the light signal in which noise signals are superposed and the noise signals.

The gate of the transmission MOS transistor 202 is connected to a first row selection line (vertical scanning line) Ptx. The gates of the transmission MOS transistors 202 of other signal output elements Pixel arranged at the same row are also commonly connected to the first row selection line Ptx. The gate of the reset MOS transistor 203 is connected to the second row selection line (vertical scanning line) Pres. The gates of the reset MOS transistors 203 of other signal output elements Pixel arranged at the same row are also commonly connected to the second row selection line Pres. The gate of the selection MOS transistor 205 is connected to the third row selection line (vertical scanning line) Psel. The gates of the selection MOS transistors 205 of other signal output elements Pixel arranged at the same row are also commonly connected to the third row selection line Psel. These first to third row selection lines Ptx, Pres and Psel are supplied with a signal voltage from the vertical shift register 301.

The remaining rows shown in FIG. 3, are also provided with signal outputting elements Pixel and row selection lines having similar configurations. In these row selection lines, signal pulses formed by the above-mentioned vertical shift register 301 are supplied to row selection lines Ptx2 to Ptx3, Pres2 to Pres3, and Psel2 to Psel3.

The source of the selection MOS transistor 205 is connected to a vertical signal line. The sources of the selection MOS transistors 205 of the signal output elements Pixel arranged at the same column are also connected to the same vertical signal line. In FIG. 3, the vertical signal line is connected to a current generator 307 which is load means. The current generator 307 constitutes a part of a source follower circuit together with the amplification MOS transistor.

Figure 4:
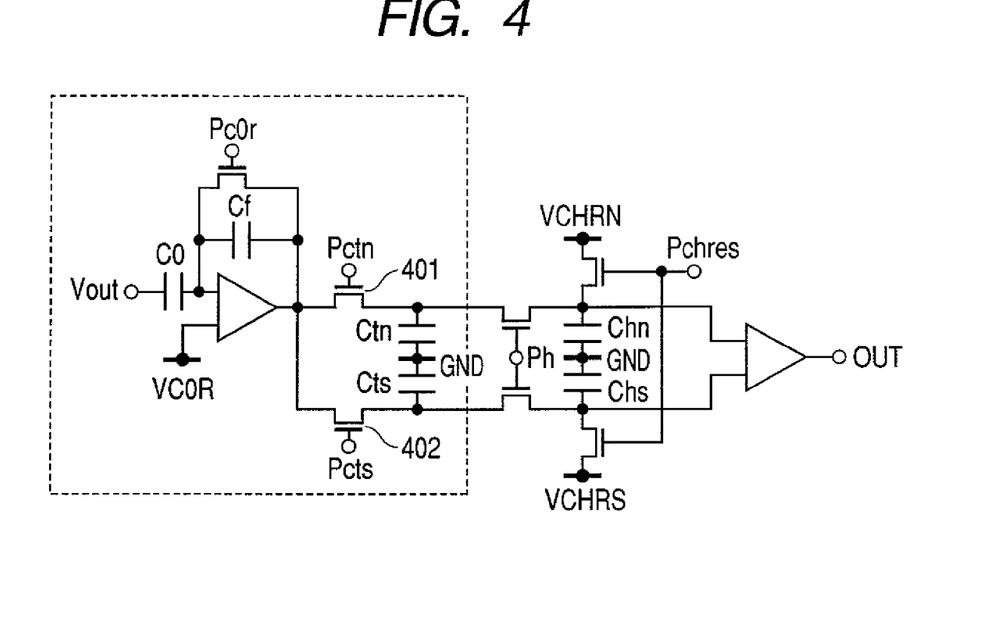
FIG. 4 is a block diagram of a reading circuit of the MOS type solid-state image pickup apparatus.

FIG. 4 is a view showing an example of a circuit for one column of blocks of the reading circuit 302 shown in FIG. 3. Portions enclosed by broken lines are present for one column of blocks, and the terminal Vout in FIG. 2 is connected to each of the vertical signal lines.

Figure 5:
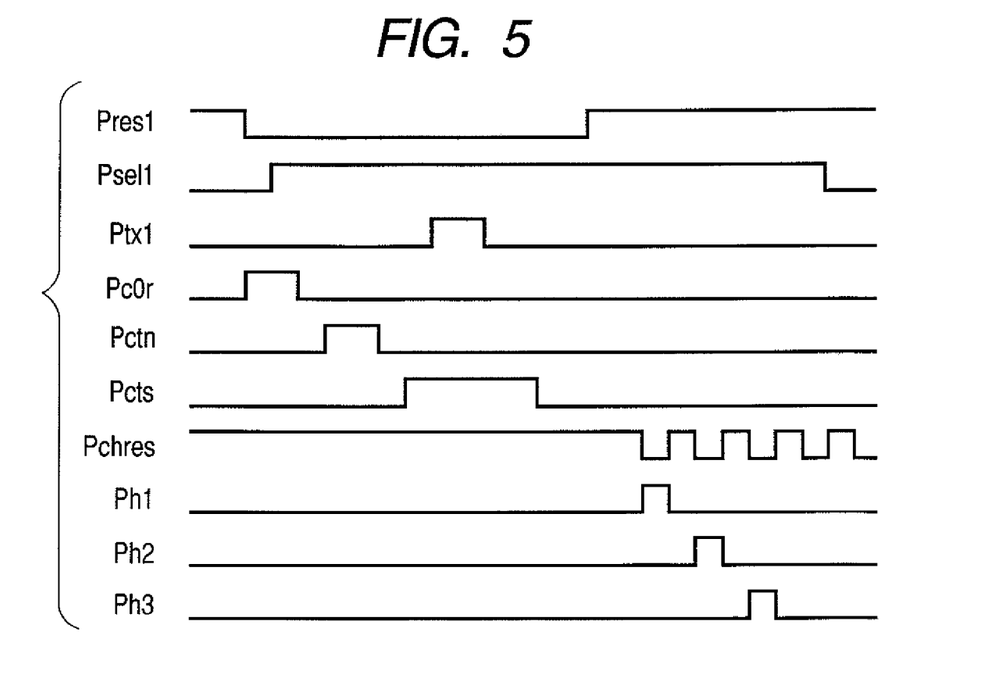
FIG. 5 is a timing chart explaining an operation of MOS type solid-state image pickup apparatus.

FIG. 5 is a timing chart showing an example of the operation of a MOS type solid-state image pickup apparatus shown in FIGS. 2 to 4. In advance of reading of light signal electric charges from the photo-diode 201, gate lines Pres1 of the reset MOS transistor 203 becomes high-level, and it is activated. In this way, the gate of the amplification MOS transistor 204 is set to a reset voltage. If the gate line Presl of the reset MOS transistor 203 becomes low-level, the gate line PcOr (FIG. 4) of a clamping switch becomes high-level, and after that, the gate line Psell of the selection MOS transistor 205 becomes high-level and it is activated. By this, the noise signal is read to the vertical signal line Vout, and clamped in each clamping capacitance CO of respective columns Next, after the gate line PcOr of the clamping switch returns to low-level, the gate line Pctn of a first signal transmission switch 401 becomes high-level, and a reset signal is held in the noise holding capacitances Ctn provided in each row. After the gate line Pctn returns to low level, the gate line Pcts of a second transmission switch 402 becomes high level.

Next, the gate line Ptx1 of the transmission MOS transistor 202 becomes high-level, light signal electric charges of the photo-diode 201 are transmitted to the gate of the amplification MOS transistor 204, and a light signal is read to the vertical signal line. Next, after the gate line Ptx1 of the transmission MOS transistor 202 becomes low-level, the gate line Pcts of the second signal transmission switch 402 becomes low-level. By this, a changed amount (light signal) from the reset signal is read to the signal holding capacitances Cts provided in each row. By these operations, the signal of a signal outputting elements Pixel of a first row are held in signal holding capacitances Ctn and Cts of respective columns.

After that, the gates of the horizontal transmission switch of each columns becomes high-level one by one by a signal Ph supplied from the horizontal shift resistor 306. Signals have been held by the signal holding capacitances Ctn and Cts are read to horizontal outputting lines Chn and Chs one by one, subjected to differencing processing using an output amplifier, and then outputted to the output terminal OUT one by one. The horizontal outputting lines Chn and Chs are reset to reset voltages VCHRN and VCHRS by a reset switch at intervals of reading signals of respective columns. By above processing, reading of pixel cells Pixel connected to a first row will be finished. Hereinafter, similarly, the signals of pixel cells Pixel connected subsequent to the second row are read one by one by signals from the vertical shift register 301, and reading of the entire pixel cells Pixel will be finished.

Figure 6:
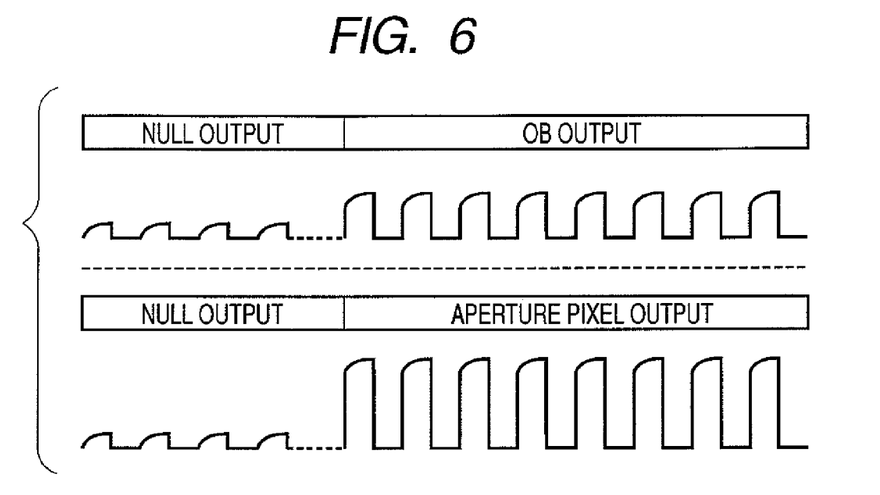
FIG. 6 is a figure showing an output waveform of the MOS type solid-state image pickup apparatus.

FIG. 6 shows the output waveform when the solid-state image pickup apparatus of FIG. 1 is constituted by MOS type solid-state image pickup apparatuses of FIGS. 2 to 4, and operated. A NULL output shows the output waveform from the second black reference signal outputting region 103 in FIG. 1, an OB output shows the output waveform from the first black reference signal outputting region 102 in FIG. 1, and an aperture pixel output shows the output waveform from the photoelectric conversion signal outputting region 101.

Since the impurity region for accumulating electric charges is not disposed in the second black reference signal outputting region 103 provided neighboring the head in the horizontal direction of the photoelectric conversion outputting region 101, the electric charges due to the dark currents are not accumulated, resulting in a lower output level an output level than that of the first black reference signal outputting region 102. Accordingly, in order to perform latter signal processing using the signal of the second black reference signal outputting region 103 and the first black reference signal outputting region 102, a wide dynamic range is required in a latter signal-processing circuit.

Figure 7:
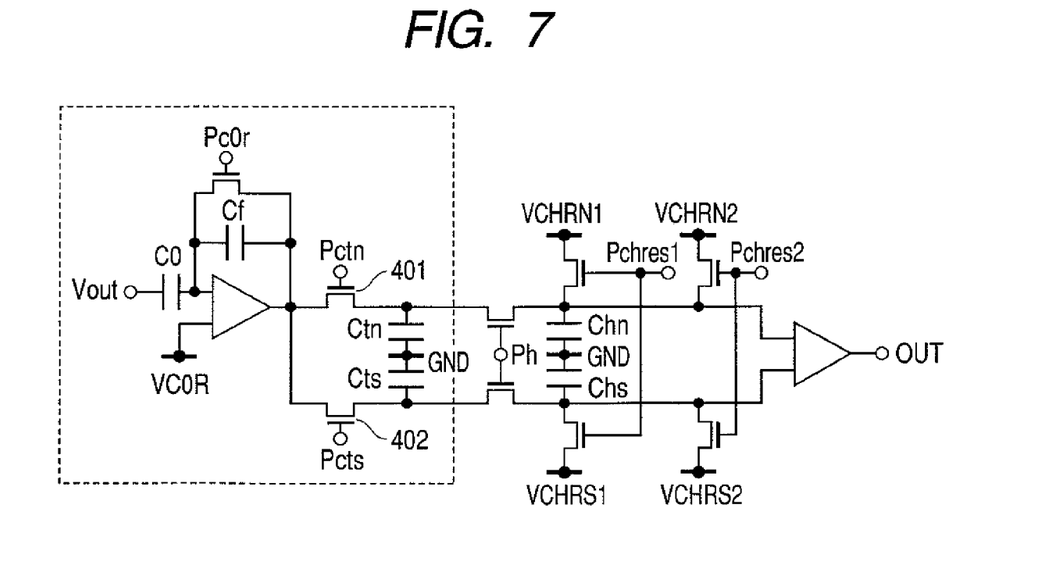
FIG. 7 is a block diagram of the reading circuit of the solid-state image pickup apparatus showing the first embodiment of the present invention.

FIG. 7 is a block diagram showing an example of the configuration of a reading circuit 302 of a first embodiment of the present invention. The difference from the block diagram of a general reading circuit in FIG. 4 is in that the reading circuit 302 has two lines of reset switches of the first and the second horizontal output lines Chn and Chs. First reset voltages VCHRN1 and VCHRS1 are supplied to horizontal outputting lines Chn and Chs by the first reset signal Pchres1. Second reset voltages VCHRN2 and VCHRS2 are supplied to horizontal outputting lines Chn and Chs by the second reset signal Pchres2. Only when the signal from the second black reference signal outputting region 103 is read to the horizontal output lines Chn and Chs, the reset voltages VCHRN2 and VCHRS2 are supplied to the horizontal output lines Chn and Chs using the second reset signal Pchres2. When the other photoelectric conversion signal outputting region 101 and the first black reference signal outputting region 102 are read to the horizontal outputting lines Chn and Chs, the reset voltages VCHRN1 and VCHRS1 are supplied to horizontal outputting lines Chn and Chs using the first reset signal Pchres1. The relations of the reset voltages at this time are VCHRN2 (VCHRS2)>VCHRN1 (VCHRS1). Thus, the level of the signal outputted from the output terminal OUT can be shifted.

Figure 8:
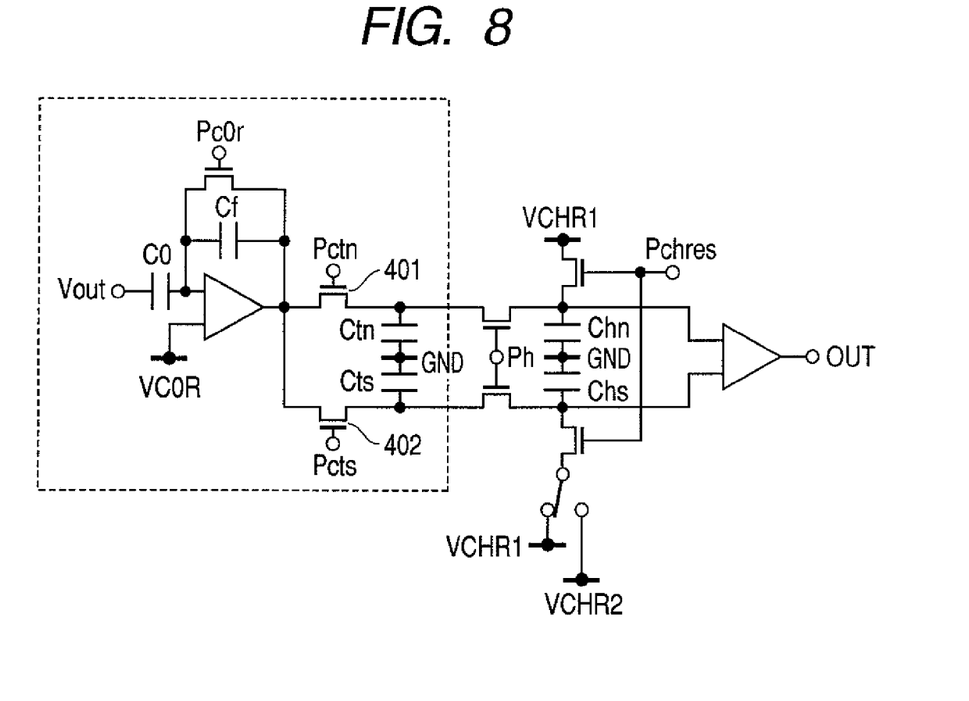
FIG. 8 is a block diagram of the read-out circuit of the solid-state image pickup apparatus showing the first embodiment of the present invention.

FIG. 8 is a block diagram showing an example of configurations of other reading circuits 302 of the first embodiment of the present invention. A method for switching reset voltages VCHR1 and VCHR2 to be supplied using a switch without changing the number of the reset switches is shown. Similar effect can also be obtained by means of this method.

Figure 9:
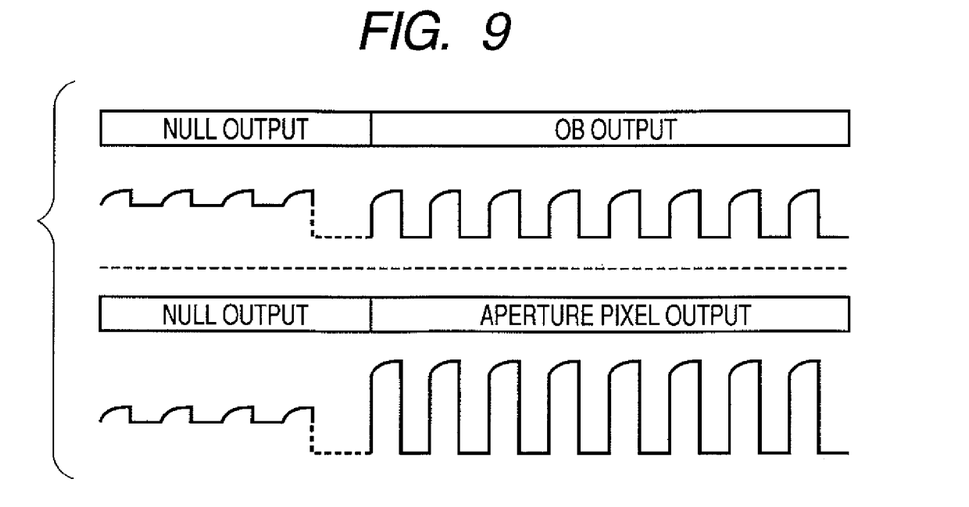
FIG. 9 is a figure showing the output waveform of the solid-state image pickup apparatus which shows the first embodiment of the present invention.

FIG. 9 shows the output waveform when a solid-state image pickup system is constituted with the solid-state image pickup apparatus in FIG. 1 and the reading circuit 302 in FIGS. 7 and 8, and operated. Since, in the second black reference signal outputting region 103 provided neighboring the head in the horizontal direction of the photoelectric conversion signal outputting region 101, the impurity region for accumulating electric charges is not formed, the electric charges due to the dark currents are not accumulated. Nevertheless, the reset voltages of the first level output line Chn and the second level output line Chs are changed into VCHRN2 and VCHRS2 , respectively, by using the second reset signal Pchres2. Thereby, an output signal having substantially the same level as that of the output of the first black reference signal outputting region 102, can be obtained. The output level (the amount of level shifts) of the second black reference signal outputting region 103 is set between the output level of the first black reference signal outputting region 102, and the saturation output level of the photoelectric conversion signal outputting region 101. By this, the latter dynamic range should also have only the difference between the output level of the first black reference signal outputting region 102, and the saturation output level of the photoelectric conversion signal outputting region 101.

As mentioned above, the means for switching the reset voltages can also be referred to as level shifting means for shifting the reference level of the output signal of the second black reference signal outputting region 103 with respect to the reference levels of the output signals of the photoelectric conversion signal outputting region 101 and the first black reference signal outputting region 102. In other words, by changing the reset level of the horizontal output line, the level to be the reference of a signal component, is changed.

Second Embodiment

Figure 10:
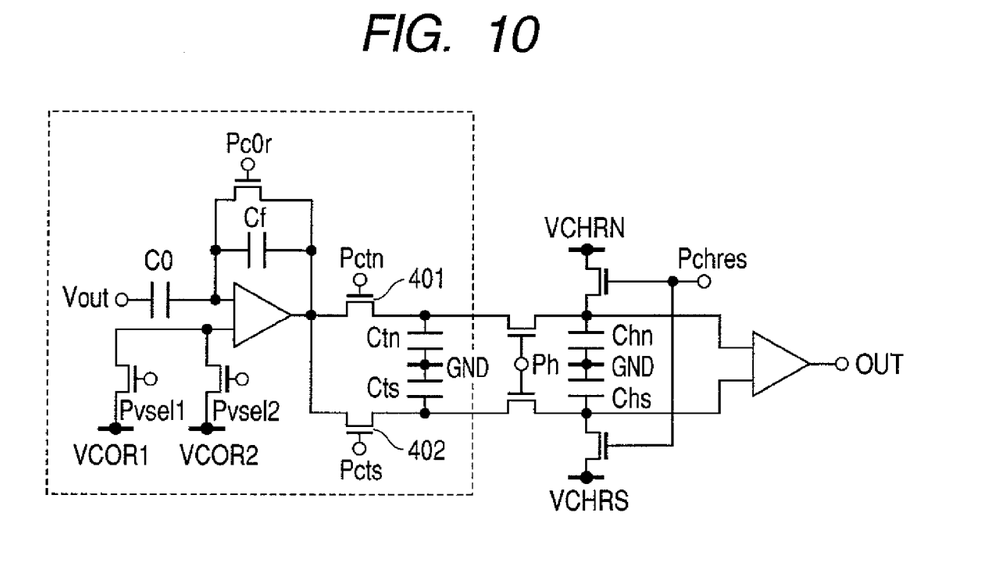
FIG. 10 is a block diagram of a reading circuit of a solid-state image pickup apparatus showing the second embodiment of the present invention.

FIG. 10 is a block diagram showing an example of a configuration of a reading circuit 302 of a second embodiment of the present invention. The difference from the general reading circuit in FIG. 4 is in that the reading circuit 302 has two lines of the reference voltage of the clamping circuit and configured so that the reference voltages VCOR1 and VCOR2 are supplied by clamping voltage selection signals Pvsel1 and Pvsel2. According to this configuration, only when the second black reference signal outputting region 103 is clamped, it is possible to shift the level of the signal outputted from the output terminal OUT by the operations shown below.

A clamping voltage selection signal Pvres1 is made to be high-level and in an activated state, a clamping voltage selection signal Pvsel2 is made to be low-level and in an inactivated state, and a signal to be supplied to the gate line PcOr of a clamping switch is made to be high-level and in activated state. After that, the gate line Psel1 of a selection MOS transistor 205 becomes high-level, and it is activated. By this, a reset signal (noise signal) is clamped in a clamping capacitance CO using VCOR1 as a reference voltage.

Next, after the signal to be supplied to the gate line PcOr of a clamping switch becomes low-level, a first signal transmission switch 401 is made to be in an activated state by supplying a high-level signal to the gate line Pctn of the first signal transmission switch 401, and the reset signal is held in noise holding capacitances Ctn provided to respective columns.

Next, a signal supplied to the gate line Ptx1 of a transmission MOS transistor 202 is made to be high-level, and in an activated state, light signal electric charges of a photo-diode 201 are transmitted to the gate of an amplification MOS transistor 204, and by this, a light signal is read to a vertical signal line Vout. Here, a clamping voltage selection signal Pvsel1 is made to be low-level and in an inactivated state, and a clamping voltage selection signal Pvsel2 is made to be high-level and in an activated state. After the signal supplied to the gate line Ptx1 of the transmission MOS transistor 202 becomes low-level and in an inactivated state, the signal supplied to the gate line Pcts of a second transmission MOS transistor 402 is made to be low-level and in an inactivated state. By this, using VCOR2 as the reference voltage, the changed amount (light signal) from the reset signal is read into the signal holding capacitances Cts provided to respective columns. After that, the gates of the horizontal transmission switches of respective columns are made to be high-level one by one by the signal Ph supplied from a horizontal shift register 306. Although the voltages held at the signal holding capacitances Ctn and Cts are read to the horizontal outputting lines Chn and Chs one by one, voltages which is subjected to level shifting by an amount of the difference voltage between VCOR1 and VCOR2, are outputted in the output terminal OUT one by one.

Third Embodiment

Figure 11:
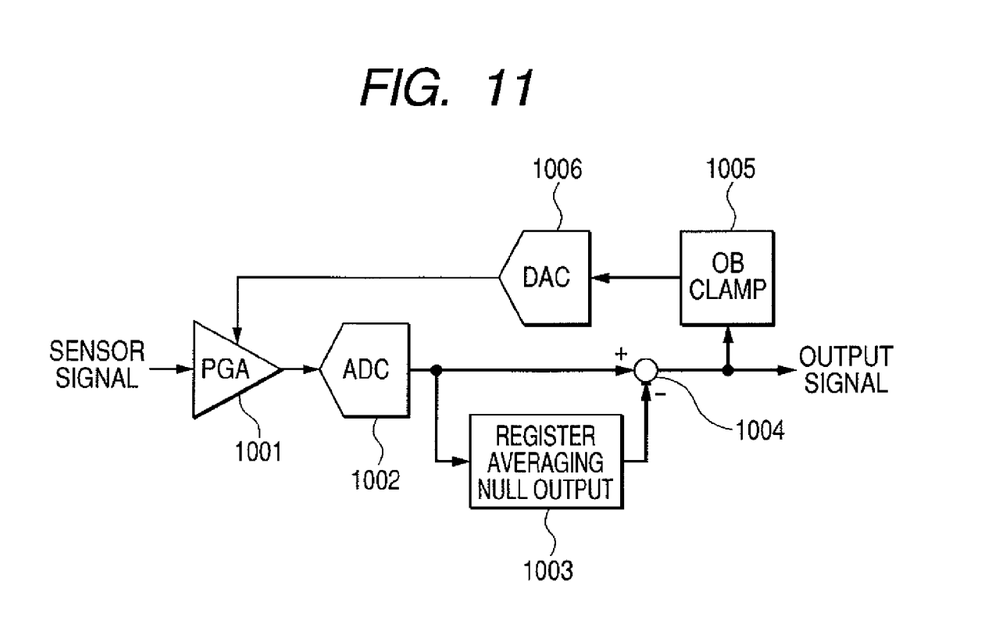
FIG. 11 is a block diagram of a signal-processing circuit of an image pickup system showing a third embodiment of the present invention.

FIG. 11 shows the block diagram of the signal-processing circuit unit of an image pickup system using a solid-state image pickup device according to a third embodiment of the present invention. The sensor signal outputted from the solid-state image pickup apparatus is amplified at a programmable gain amplifier (PGA) 1001. At that time, the reference signal is supplied by converting the digital signal generated by an OB clamping block 1005 into an analog signal using a digital-to-analog converter (DAC) 1006. An analog-to-digital converter (ADC) 1002 converts the output signals of the programmable gain amplifier 1001 as analog signals into digital signals. A register 1003 averages the output signals from the second black reference signal outputting region 103, and memorizes the averaged signal value. A subtracter 1004 subtracts the average value of the register 1003 from the output signals of the analog-to-digital converter 1002, and outputs a signal. The signal from the subtracter 1004 is inputted into the OB clamping block 1005. Then, the reference signal is generated so that the signal subjected to averaging processing etc. based on the output signal of the first black reference signal outputting region 102 of the solid-state image pickup apparatus shown in FIG. 1, become a desired value. The digital-to-analog converter 1006 converts the reference signal as digital signal into an analog signal, and outputs it to the programmable gain amplifier 1001. By this, the reference voltage of the signal inputted into the programmable gain amplifier 1001 is determined. In the analog-to-digital converter (ADC), an amplified sensor signal is converted into a digital signal.

In a general solid-state image pickup apparatus, in addition to the head in the vertical direction of the photoelectric conversion signal outputting region 101, the head or behind in the horizontal direction of the photoelectric conversion signal outputting region 101 are provided with the first black reference signal outputting region 102. In order to correct shading in the vertical direction, the reference signal should be generated by the OB clamping block 1005 at every column. At that time, adverse effects occur such as that due to the fluctuation of the dark outputs of the first black reference signal outputting region 102, and the presence of pixels having a specifically large dark output, called defects, the reference signals fluctuate for every rows, resulting in lateral lines on an image plane.

Meanwhile, in the solid-state image pickup apparatus of FIG. 1 according to the embodiments of the present invention, the black reference pixel region 103 is provided, in which the impurity region for accumulating electric charges is not formed neighboring the head in the horizontal direction of the aperture pixel region 101. The register 1003 operates so that only the difference in average value between the second black reference signal outputting region 103 (of, for example, the first row 104 in FIG. 1) and each row (for example, the second row 105 in FIG. 1) is corrected, immediately after the processing of the OB clamping block 1005 is completed. The OB clamping block 1005 performs processing using the first black reference signal outputting region 102 provided to the head in the vertical of the photoelectric conversion signal outputting region 101. Specifically, processing in which, using zero as the initial value, the average value of the second black reference signal outputting region 103 of each row is subtracted from the output of the analog-to-digital converter (ADC) 1002, is performed. By this processing, it is possible to perform stable clamping that corrects only vertical shading without being affected by the fluctuation of the dark outputs, and pixels having a specifically large dark output, called defects, and to obtain a high quality image with no lateral line etc.

As mentioned above, the programmable gain amplifier 1001, the digital-to-analog converter (DAC) 1006, and the OB clamping block 1005 constitute the clamping means, and clamp the output signal of the solid-state image pickup apparatus depending on the output signal of the first black reference signal outputting region 102. The programmable gain amplifier 1001 amplifies the output signal of the solid-state image pickup apparatus. The OB clamping block 1005 outputs such a reference signal that the signal subjected to averaging processing etc. based on the output signal of the optical black region 102 amplified by the programmable gain amplifier 1001 has a desired voltage. The programmable gain amplifier 1001 amplifies using the average value of the output signals of the first black reference signal outputting region 102 as a reference value. The subtracter 1004 subtracts the average value of the signals from the second black reference signal outputting region in the register 1003 from the output signal of the solid-state image pickup apparatus.

Fourth Embodiment

Figure 12:
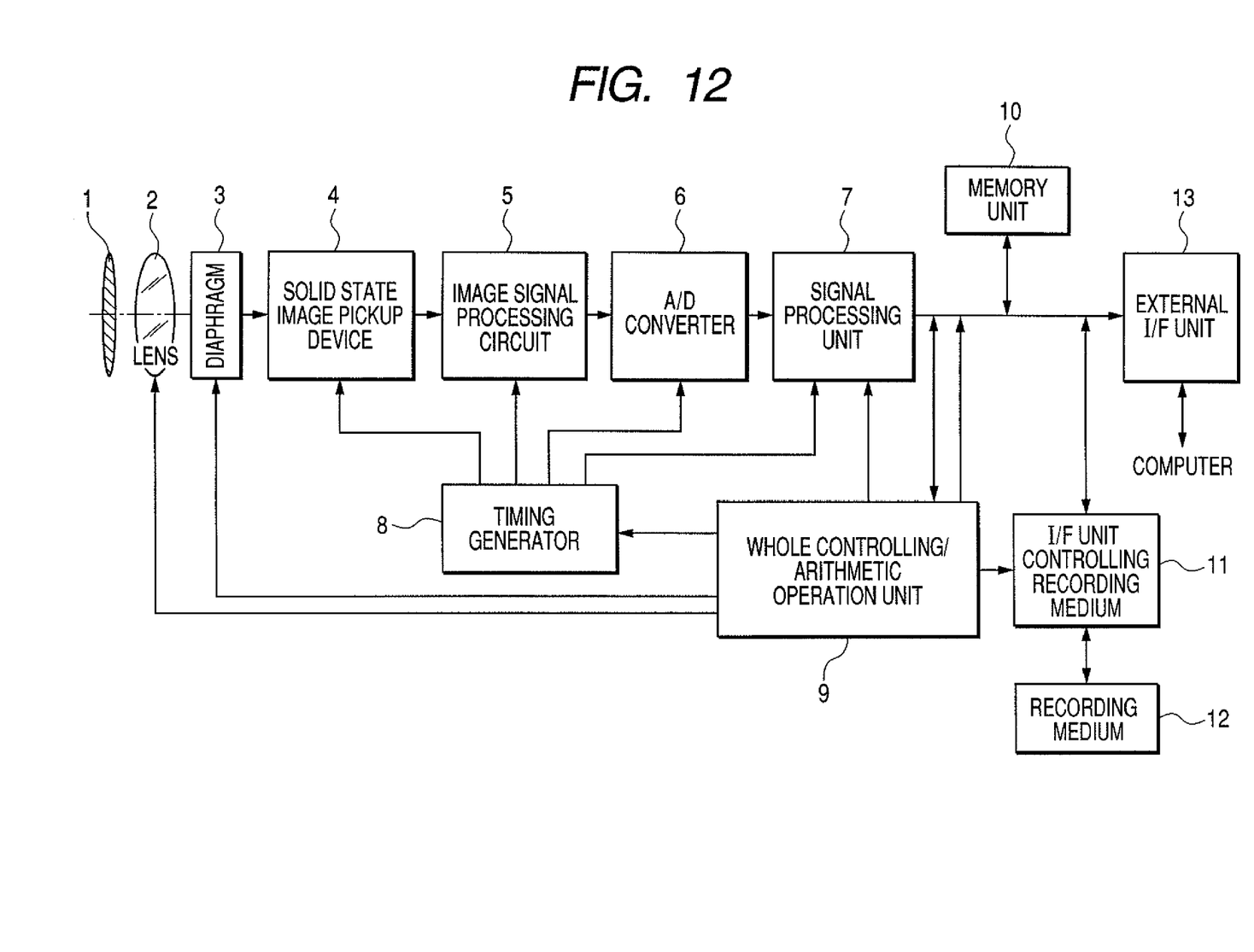
FIG. 12 is a block diagram showing an example of configuration of a digital still camera of a fourth embodiment of the present invention.

FIG. 12 is a block diagram showing an example of the configuration of a digital still camera according to a fourth embodiment of the present invention. With reference to FIG. 12, an example when the solid-state image pickup apparatuses of the first to the third embodiments are applied to a digital still camera will be described in detail.

In FIG. 12, reference numeral 1 is a barrier having both functions of protecting a lens and of a main switch, reference numeral 2 is the lens which forms the optical image of a photographic subject in the solid-state image pickup device 4, and reference numeral 3 is a diaphragm for causing the amount of light passing through the lens 2 to be variable. Reference numeral 4 is a solid-state image pickup device for taking in the photographic subject of which image is formed by the lens 2 as an image signal, and reference numeral 5 is an image signal processing circuit for subjecting the image pick-up signal (image signal) outputted from the solid-state image pickup device 4 to analog signal processing. Reference numeral 6 is an A/D converter for subjecting the image signal outputted from the image signal processing circuit 5 to an analog-digital conversion, and the reference numeral 7 is a signal processing unit for subjecting the image data outputted from the A/D converter 6 to various types of corrections and for compressing data. Reference numeral 8 is a timing generating unit for outputting various types of timing signals to the solid-state image pickup device 4, the image signal processing circuit 5, the A/D converter 6, and the signal processing unit 7. Reference numeral 9 is a whole controlling/arithmetic operation unit for controlling various types of arithmetic operations and the whole of a still video camera, the reference numeral 10 is a memory unit for memorizing image data temporarily, and the reference numeral 11 is an interface unit for memorizing or reading into or from a recording medium 12. Reference numeral 12 is a detachable and attachable recording medium such as a semiconductor memory for memorizing or reading image data etc., and the reference numeral 13 is an interface unit for communicating with an external computer etc. The solid-state image pickup apparatus in FIG. 1 of the present invention corresponds to the solid-state image pickup device 4, and the signal-processing circuit unit of the image pickup system in FIG. 11 corresponds to the image pick-up signal processing unit 5 and the A/D converter 6.

Next, the operations of the digital still camera during photographing in the above-mentioned configuration will be described. When a barrier 1 is opened, a main power supply is turned on, next the power supply of a control system is turned on, and further the power supply of an image pick-up system circuit such as the A/D converter 6, is also turned on. Then, in order to control an exposure amount, the diaphragm 3 is opened by the whole controlling/arithmetic operation unit 9, and after the signal outputted from the solid-state image pickup device 4 is converted by the A/D converter 6 via the image signal processing circuit 5, it is inputted into the signal processing unit 7. Based on the data, calculation of exposure is performed by the whole controlling/arithmetic operation unit 9. Brightness is determined by the result of the photometry performed, and depending on the result, the whole controlling/arithmetic operation unit 9 controls the diaphragm 3.

Next, based on the signal outputted from the solid-state image pickup device 4, a high frequency component is taken out and the distance to the photographic subject is calculated by the whole controlling/arithmetic operation unit 9. After that, by driving the lens, whether focused or not is determined, and when it is determined that focusing is not achieved, and distance is measured again by driving the lens. Then, after focusing is confirmed, primary exposure is started. After the exposure is completed, the image signal outputted from the solid-state image pickup device 4 is subjected to A/D conversion by the A/D converter 6 via the image signal processing circuit 5, passed through the signal processing unit 7, and it is written in the memory unit 10 by the whole controlling/arithmetic operation unit 9. After that, under controlling by the whole controlling/arithmetic operation unit 9, the data stored in the memory unit 10 is passed through a recording medium controlling I/F 11 unit, and recorded on the detachable and attachable recording medium 12 such as a semiconductor memory. Moreover, image may also be processed by directly inputting data in a computer etc. through an external I/F unit 13.

According to the first to fourth embodiments, the output level of the black reference pixel region 103 in which no impurity region for accumulating electric charges is formed can be set between the output level of the light shielded optical black region 102, and the output level at the time of the saturation of the aperture pixel region 101. Consequently, it is not required for the dynamic range of the circuit 1005 performing clamping, the first step amplifier 1001 and the analog-to-digital converter 1002, and the dynamic range of the digital output of the analog-to-digital converter 1002 to be set to be wide in particular.

Furthermore, stable clamping which corrects only vertical shading without being affected by the fluctuation of the dark outputs, and pixels having a specifically large dark output, called defects, and obtaining a high quality image with no lateral line etc. can be achieved.

The above-mentioned embodiments are applicable to a solid-state image pickup apparatus and a solid-state image pickup system which are extensively used for a video camera, a digital still camera, and an image inputting device for an image scanner.

Any one of the above-mentioned embodiments is merely a specific example when the present invention is performed, thereby, the technical scope of the present invention should not be interpreted in a limited manner. In other words, the present invention can be performed in various forms without departing its technical ideas or its main aspects.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-349872, filed Dec. 2, 2005, which is hereby incorporated by reference herein in its entirety.

What is claimed is:

1. An image pickup apparatus comprising:
a photoelectric conversion signal outputting element for accumulating and outputting an electric signal generated based on an incident light;
a first black reference signal outputting element that is light shielded, the first black reference signal outputting element having an accumulation area capable of accumulating dark currents;
a second black reference signal outputting element, which does not have an accumulation area; and
level shifting means for shifting an output of the second black reference signal outputting element to a level between an output of the first black reference signal outputting element and an output of the photoelectric conversion signal outputting element.

2. The image pickup apparatus according to claim 1, wherein
a region of the first black reference signal outputting element is provided neighboring a region of the photoelectric conversion signal outputting element at least in a vertical direction thereof; and
a region of the second black reference signal outputting element is provided neighboring a region of the photoelectric conversion signal outputting element at least in a horizontal direction thereof.

3. The image pickup apparatus according to claim 1, wherein
the photoelectric conversion signal outputting element includes an carrier accumulation area for accumulating electric charges, and a reading unit for reading signals from the carrier accumulation area; and
the accumulation area of the first black reference signal outputting element has a same structure as that of the carrier accumulation area of the photoelectric conversion signal outputting element, and the first black reference signal outputting element has a reading unit having a same structure as that of the reading unit of the photoelectric conversion signal outputting element.

4. The image pickup apparatus according to claim 1, wherein the image pickup apparatus is incorporated in an image pickup system that includes:

clamping means for clamping output signals of the image pickup apparatus based on output signals of the first black reference signal outputting element; and
subtracting means for subtracting an average value of output signals of second black reference signal outputting element from the output signals of the image pickup apparatus clamped based on the output signals of the first black reference signal outputting element.

5. The image pickup apparatus according to claim 2, wherein the image pickup apparatus is incorporated in an image pickup system that includes an amplifier for amplifying output signals of the image pickup apparatus, wherein
a reference signal of the amplifier is generated based on an average value of signals from a plurality of first black reference signal outputting elements, and
an average value of signals from a plurality of second black reference signal outputting elements contained in a same line is subtracted from an output of photoelectric conversion signal outputting elements arranged in a same line.

6. The image pickup apparatus according to claim 5, wherein the image pickup system further includes:
analog-digital converting means for converting analog output signals of the amplifier into digital signals; and
digital-analog converting means for converting a digital average value into an analog signal.

7. The image pickup apparatus according to claim 1, wherein the image pickup apparatus is incorporated in a camera that includes:
a lens for forming an optical image in the image pickup apparatus; and
a diaphragm for causing an amount of light passing through the lens to be variable.

8. A processing method for processing signals from a solid-state image pickup apparatus including a first black reference outputting element, which is shielded and has a accumulation area that can accumulate dark currents, and a second black reference outputting element, which does not have the accumulation area, the method comprising:
shifting an output of the second black reference signal outputting element to a level between an output of the first black reference signal outputting element and an output of the photoelectric conversion signal outputting element.

* * * * *